(12) United States Patent
Shen et al.

(10) Patent No.: US 9,177,602 B2
(45) Date of Patent: Nov. 3, 2015

(54) CLIP BASED TRICK MODES

(75) Inventors: Richard Chi-Te Shen, Morgan Hill, CA (US); Alan Cavallerano, Bedford, NY (US)

(73) Assignee: NXP, B.V., Eindhoven (NL)

( * ) Notice: Subject to any disclaimer, the term of this patent is extended or adjusted under 35 U.S.C. 154(b) by 2566 days.

(21) Appl. No.: 10/560,709

(22) PCT Filed: Jun. 29, 2004

(86) PCT No.: PCT/IB2004/051050
§ 371 (c)(1),
(2), (4) Date: Dec. 15, 2005

(87) PCT Pub. No.: WO2005/001836
PCT Pub. Date: Jan. 6, 2005

(65) Prior Publication Data
US 2006/0127035 A1    Jun. 15, 2006

Related U.S. Application Data

(60) Provisional application No. 60/483,790, filed on Jun. 30, 2003.

(51) Int. Cl.
| | | |
|---|---|---|
| H04N 5/91 | (2006.01) | |
| G11B 27/00 | (2006.01) | |
| G11B 27/10 | (2006.01) | |
| H04N 5/783 | (2006.01) | |
| H04N 5/782 | (2006.01) | |

(Continued)

(52) U.S. Cl.
CPC ............ *G11B 27/005* (2013.01); *G11B 27/107* (2013.01); *H04N 5/783* (2013.01); *G11B 2220/90* (2013.01); *G11B 2220/91* (2013.01); *H04N 5/782* (2013.01); *H04N 5/85* (2013.01); *H04N 5/915* (2013.01); *H04N 9/8042* (2013.01); *H04N 9/8205* (2013.01)

(58) Field of Classification Search
USPC .................. 86/1, 46, 52, 68, 75, 82, 124–126
See application file for complete search history.

(56) References Cited

U.S. PATENT DOCUMENTS

| 5,664,044 A | 9/1997 | Ware | |
|---|---|---|---|
| 6,064,794 A * | 5/2000 | McLaren et al. | 386/343 |

(Continued)

FOREIGN PATENT DOCUMENTS

| EP | 1174879 | 1/2002 |
|---|---|---|
| EP | 1182584 | 2/2002 |

(Continued)

OTHER PUBLICATIONS

Kim Eunsam et al, "Design and Implementation of an Enhanced Personal Video Recorder for HDTV", International Conf. On consumer Elec., 2001 digest of Techn. Papers, ICCE, Los Angeles, CA, Jun. 19-21, 2001, IEEE, US, Jun. 19, 2001, pp. 316-317, XP010552182, ISBN 0-7803-6622-0.

*Primary Examiner* — William C Vaughn, Jr.
*Assistant Examiner* — Eileen Adams (57) ABSTRACT

Multi-frame trick play clips of the stored performance are selected for playing in a trick play mode, portions between the trick play clips, at least as long as the trick play clips, are skipped in the trick play mode. The trick play clips are sufficiently long and presented at a sufficiently low speed so that the content of the trick play clips can be understood by a human audience.

47 Claims, 2 Drawing Sheets (51) Int. Cl.
*H04N 5/85* (2006.01)
*H04N 5/915* (2006.01)
*H04N 9/804* (2006.01)
*H04N 9/82* (2006.01)

(56) References Cited

U.S. PATENT DOCUMENTS

| | | | |
|---|---|---|---|
| 6,141,486 A * | 10/2000 | Lane et al. | 386/200 |
| 6,324,337 B1 | 11/2001 | Goldwasser | |
| 6,463,486 B1 | 10/2002 | Raja et al. | |
| 6,501,902 B1 | 12/2002 | Wang | |
| 6,868,224 B1 * | 3/2005 | Birmingham et al. | 386/343 |
| 7,313,808 B1 * | 12/2007 | Gupta et al. | 725/89 |
| 2002/0002564 A1 | 1/2002 | Munetsugu et al. | |
| 2002/0015576 A1 | 2/2002 | Gordon et al. | |
| 2002/0034374 A1 | 3/2002 | Barton | |
| 2002/0044761 A1 | 4/2002 | Takashima et al. | |
| 2002/0051010 A1 | 5/2002 | Jun et al. | |
| 2002/0061183 A1 | 5/2002 | MacInnis | |
| 2002/0150383 A1 | 10/2002 | Kato et al. | |
| 2002/0178452 A1 | 11/2002 | ***Lecomte | |
| 2002/0178453 A1 | 11/2002 | Jun et al. | |
| 2003/0026589 A1 | 2/2003 | Ramsay et al. | |
| 2003/0072556 A1 | 4/2003 | Okujima et al. | |
| 2003/0160944 A1 | 8/2003 | Uchihashi et al. | |

FOREIGN PATENT DOCUMENTS

| | | |
|---|---|---|
| WO | WO9965239 | 12/1999 |
| WO | WO03019932 | 3/2003 |
| WO | 2004/059971 | 7/2004 |

* cited by examiner

CLIP BASED TRICK MODES

CROSS REFERENCE TO RELATED APPLICATION

This application claims the benefit of U.S. provisional application Ser. No. 60/483,790 filed Jun. 30, 2003, which is incorporated herein by reference.

The invention herein is related to the field of trick play modes for presentation of stored multimedia performances. These multimedia performances usually consist of audio, video and optionally shown text captions. A performance usually has a normal forward speed at which the performance is usually presented to the audience. Recording and playing devices for stored performances often provide, trick play modes for video such as fast foreword, reverse and fast reverse play so that the user can skip material or more conveniently find a desired position to start recording or playing a performance. Trick play video modes are usually at different speeds or in reverse direction and often at different smoothness then normal play. During known trick video play audio and captions is not played.

During normal play, video frames are typically presented to the audience at a constant predetermined video frame rate with each frame presented for a constant predetermined normal frame period. Similarly, digital audio is usually divided into audio frames which are also presented to the audience at a constant predetermined audio frame rate. This results in the presentation having a normal speed for video and audio. On the other hand, data for captions is presented at a varying rate that is much lower than the video or audio frame rate. During normal play each caption is presented for a normal time period that is long enough for the audience to read the caption. Usually during normal play, each caption stays on the screen until it is erased by the next caption or blank caption.

The speed and direction of a trick play mode is usually expressed in relation to the normal forward speed at which the performance is normally presented to an audience. For example, 2× speed means that the video is being presented at twice the normal speed. To provide 2× video speed the video frames may be presented at twice the normal video frame rate for half the normal video frame period. However, video displays often only accept frames at a single predetermined frame rate. In that case 2× speed may be achieved by skipping half the frames and presenting the remaining frames at the normal frame rate and for the normal frame period. Presenting half the frames at twice the frame rate may result in a visibly jerky motion. As trick speed video increases beyond about 8× then the normal movement of objects and people and panning of the camera and the changing of camera angles will result in a presentation can not be understood by the audience.

MPEG is a common format for encoding to compress digital video. For example, there may be, for example, 16 pictures in each GOP. Each picture is called a frame. The first frame presented in a GOP is called an I-frame and its decoding is independent (like a JPEG picture) it does not depend on the decoding of any other frame. Other frames in a GOP are P-frames and B-frames. The decoding of the P-frames depend on the decoding of the closest previous I-frame or P-frame in the GOP. The decoding of the B-frames depends on the decoding of both the closest subsequent P-frame as well as the decoding of the closest previous I-frame or P-frame.

The MPEG data stream consists of a series of packets each having a header with a predetermined format and each having a data section. The header includes and ID which identifies the packets containing the data for a particular video frame. All the data packets for one video frames is transmitted/stored before any of the data packets for the following video frame so that the packets for different video frames are not intermixed. However, the data packets for other media such as audio frames or captions may be intermixed with the data packets for the video frames.

The compressed data for the video frames is transmitted and stored in the order in which it is needed for decoding so that a GOP that would be presented in the order of:

$I, B_1, B_2, P_1, B_3, B_4, P_2, B_5, B_6, P_3, B_7, B_8, P_4, B_9, B_{10}, P_5$ would be transmitted and stored in the order of:

$I, P_1, B_1, B_2, P_2, B_3, B_4, P_3, B_5, B_6, P_4, B_7, B_8, P_5, B_9, B_{10}$ because, for example, the data of the $P_1$ frame is required for the decoding of the $B_1$ and $B_2$ frames that are presented before the $P_1$ frame is presented.

Providing high speed trick play modes for MPEG compressed video has been challenging because decoding requires substantial processing effort. For example, skipping half the frames does not proportionately decrease the required decoding effort since all the I-frames and P-frames still have to be decoded in order to decode the required B-frames, and the I-frames and P-frames require much more effort to decode than the decoding of the B-frames.

In a well known fast foreword trick play mode for MPEG compressed digital multimedia presentations, only the I-frames and none of the other types of frames are presented. If the multiple of the speed of the trick mode presentation is less than the number of I-frames in a GOP, then I-frames have to be presented for a longer than normal frame period. This results in an extremely jerky presentation, but at least the audience can recognize portions of the video at in the fast foreword trick play mode. For example, for 4× speed and 16 pictures in each GOP, each I-frames would be shown for 4× the normal frame time. The beginnings of the I-frames are usually called video trick mode entry points because decoding can only begin at an I-frame. In order to quickly find the I-frames an indication of the locations of the video trick mode entry points (e.g. the beginnings of the I-frames) can be provided, such as, by providing a flag in the last data packet before an I-frame. A video trick mode exit point is a position in the MPEG data stream where decoding can stop without leaving any errors or anomalies called artifacts. The end of each video frame is a trick mode exit point for MPEG video.

In order to minimize confusion, applicant has used the term "media" to refer to different types of presentations such as audio, video, text. Applicant has used the term "medium" to refer to storage medium such as record carrier and to transmission medium such as space or wires or optical cables through which signals in the form of electromagnetic waves are transmitted. Those who are unfamiliar with the art should be careful since both media and medium are often used interchangeably in the field.

In U.S. Pat. No. 5,664,044 to Ware, both audio and video are presented in a faster than normal trick play mode. In U.S. Pat. No. 6,064,794 to McLaren et. al., determining entry points for trick play modes of MPEG encoded video is disclosed. In WO99/65239 to Erenburg et. al. storing entry points for trick mode play along with MPEG encoded video is disclosed. Those skilled in the art are directed to the above references which are hereby incorporated in whole by reference.

In the invention herein, a clip based trick mode for playing a performance is provided. The performance may be, for example, an audio and/or video performance. A performance includes a multitude of sequential frames for presentation during normal playing of the performance in a predetermined normal frame presentation order at a predetermined normal frame rate. The performance also has a normal speed of motion and a normal direction at which the presentation is normally presented to the audience. The performance is stored on a storage medium and then portions of the performance are read from the storage medium for playing the performance. Frames of the performance are subdivided into trick play clips and fast skim clips. The trick play clips and the fast skim clips each contain multiple sequential frames with the trick play clips alternate with the fast skim clips in the normal frame presentation order. The frames of different media may be included in the same trick play clips or the frames of different media may be subdivided differently.

During the playing of the performance in the trick play mode, the trick play clips are played and the fast skim clips are skimmed. The skimming may be either skipping of fast skim clips entirely or playing fast skim clips at a substantially higher speed than the trick play clips. Some frames of the trick play clips may need to be skipped for high speed trick play video modes. If the fast skim clips are played at a high speed then some of the frames of the fast skim clips may have to be skipped. The average speed of the playing and skimming in the trick play mode is substantially different than the normal speed for the performance. The trick play clips are sufficiently long and presented at a sufficiently low speed so that the content of the trick play clips can be understood by a human audience.

In the trick play mode, the speed at which the trick play clips are played may be normal or may be slower or faster than normal and may be either forward or reverse. The speed for playing the trick play clips may be predetermined during editing or user adjustable during the trick mode play. For a multimedia performance, in the invention, the speed at which different media are played, may be different for different media. The trick play clips for video may be different than the trick play clips for audio. For example, a trick play mode could be provided with 2× audio speed and 8× video speed in which, all the clips will be used for video, but only ¼ of the clips will be used for audio. This allows a fast smooth video playback of selected clips and simultaneous audio playback of selected clips that are still understandable. The order in which the clips are presented can be different than the order in which the frames within each clip are shown. One possibility is a fast reverse video trick mode in which clips are played in reverse order with the video frames of the clips played in reverse order, but the audio frames of the clips played in forward order so the audio can be understood. The length of the trick play clips and the length of the fast skim clips may be the same length or different lengths and the lengths may be predetermined or user adjustable during the trick mode play.

The trick play clips may begin at selected trick play entry points. When trick play clips are preselected during the editing process, then in addition to indicating the trick play entry points, an indication of which trick play entry points are selected for the start of trick play clips are also stored. The indication of the starting positions of the trick play clips may be indicated within the performance or in a table outside of the performance.

The above and other objects and features of the invention will become apparent to those skilled in the art from the following detailed description presented with reference to the following drawings.

Figure 1:
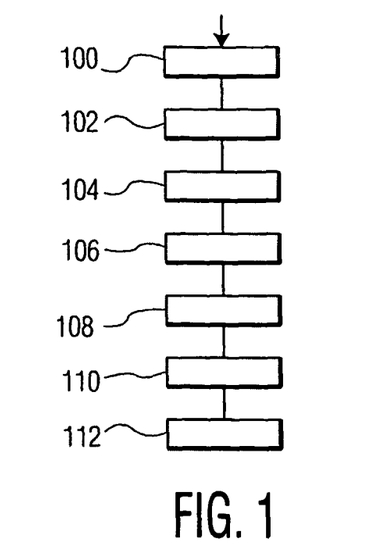
FIG. 1 is an example of a flow diagram of the method of the invention.

FIG. 1 illustrates the method of the invention. In step 100 a performance is provided. A performance includes a multitude of sequential frames for presentation during normal playing of the performance in a predetermined normal frame presentation order at a predetermined normal frame rate. The presentation has a normal speed and a normal direction of play for presentation to an audience. For example, the performance may be an audio performance or a video performance or a multimedia performance with audio, video and text captions. The performance may be broadcast or it may be received interactively.

In step 102, trick play clips for a trick mode are selected. The trick play clips contain multiple frames and the trick play clips are mutually separated by multiple frames that are defined as fast skim clips. Clips for multiple different trick modes may be selected during a authoring process of the performance (as shown) or alternatively, the trick play clips can be selected automatically, as needed, during the playing in a trick mode. Automatic selection is discussed in more detail below in relation to step 112. If the trick play clips are selected during the authoring process, they can be selected so that, the trick play clips correspond to portions that are logically understandable and recognizable. For example, trick play audio clips can be selected that contain an understandable phrase or statement, trick play video clips can be selected that contain recognizable portions of the performance. The trick play clips may even be highlights or important or memorable portions of scenes.

For different trick play modes, different trick play clips may be selected or the same set of trick play clips can be used for different trick play modes. For different media, such as video and audio, different trick play clips can be selected or the same trick play clips can be used for different media. For one media such as audio, the trick play clips can be preselected during the editing process, and for another media, such as video, the trick play clips, can be automatically selected during play in the trick play mode, based on, for example, trick mode entry points and user selected clip lengths. The trick play clips may all be the same uniform size or they may be different sizes so that the clips are more understandable.

In a video presentation using MPEG compression, usually only the beginning of each I-frame (the beginning of the first packet of the I-frame) is a video trick mode entry point. That is, video decoding can only begin at the beginning of each I-frame. Thus, trick mode clips for video must start prior to or at the beginning of an I-frame. Generally, it is convenient if the trick play clip that is used for video starts at a video trick mode entry point and ends at a trick mode video exit point. The end of each video frame (the end of the last packet of the frame) is a video trick mode exit point.

In MPEG audio, each audio frame is independently decodable so that the beginning of each audio frame (the beginning of the first packet for the audio frame) is an audio trick mode entry point and the end of each audio frame (the end of the last packet for the audio frame) is an audio trick mode exit point.

In step 104, the performance is compressed. For example, MPEG II type video compression may be used for video and MPEG type audio compression may be used for audio. Alternatively, other known methods of compressing of performances could be used. The compression may be variable, such as MPEG II, or the compression can be a fixed ratio type compression. In MPEG compressed performances, the beginning of each I frame is a video trick mode entry point and the beginning of each audio frame is an audio trick mode entry point, and the beginning of each caption is a text trick mode entry point.

In step 106, indication of the position of the trick play clips are provided. The indication may be provided as pointers to the positions of the start of the trick play clips, or the positions can be indicated within the compressed performance. For example, a tag in the header of the last packet of an MPEG II compressed stream prior to the start of the trick play clip can be used to indicate the beginning of a trick play clip.

For variable compression schemes such as MPEG II, generally indications of positions can not be determined until after the performance is compressed. For MPEG video compression, the beginning of each group of pictures is a video trick mode entry point, and for convenience in decoding, the start of each trick play video clip may correspond to one of these video trick mode entry points.

It may be convenient to provide indications of both the video trick mode entry points and the positions of the video trick play clips or indications of which video trick mode entry points are also the beginnings of video trick play clips.

In step 108, the performance is stored on a storage medium. If the positions of the trick play clips are predetermined, then indications of the positions of the trick play clips are also stored on the same storage medium. The position indication for the trick play clips may be in the form of pointers in which case they can be stored on the storage medium as a table of pointers. If the positions indication is in the form of tags in the packets of an MPEG II compressed performance then the packets are modified prior to storing on the storage medium.

If trick mode entry points are indicated in the stored performance and if the trick play clips begin at selected trick mode entry points, then an indication of which trick mode entry points are also the beginnings of trick play clips is also stored so as to indicate the beginnings of the trick play clips.

In step 110, in a trick play mode, the trick play clips are read from the storage medium. If the positions of the trick play clips are predetermined, then indications of the positions of the trick play clips are also read from the storage medium. If the fast skim clips are going to be skipped in the trick play mode then at least portions of the fast skim clip may not have to be read from the storage medium. If the indications are contained in the compressed performance then portions of the fast skim clips has to be read to find and identify the indications. For example, if there are tags in the headers of packets before or at the start of the trick play clips, then at least a portion of a fast skim clip just before the start of the trick play clip has to be read in order to read the indications of the start of the trick play clip. Otherwise, if pointers to the trick play clips are stored on the storage medium, (e.g. in a table) then the fast skim clips do not need to be read, and the trick play clips can be accessed directly.

In step 112 during the playing of the performance in the trick play mode, the trick play clips are played and the fast skim clips are skimmed. The skimming may be either skipping of the fast skim clips entirely or playing the fast skim clips at a substantially higher speed than the trick play clips.

In the trick play mode, the speed at which the trick play clips are played may be normal or may be slower or faster than normal speed and may be either forward or reverse. The speed for playing the trick play clips may be predetermined during editing or user adjustable during the trick mode play. For a multimedia performance, the speed may be different for different media. The trick play clips for video may be different than the trick play clips for audio.

The average speed of the playing and skimming in the trick play mode is substantially different than the normal speed. The trick play clips are sufficiently long and presented at a sufficiently low speed so that the content of the trick play clips can be understood by a human audience. The fast skim clips may be played at such a high speed that much of the fast skim clip can not be understood or even recognized by the audience.

In an example trick play mode, the trick play video clips contain 8 frames corresponding to half of a group of pictures in an MPEG compression scheme. The fast skip clips may contain 24 frames corresponding to 1½ groups of pictures. The trick play video clips may be played at 4× speed by displaying each of the video frames of the trick play clip for ¼ of the normal frame period, and the fast skim clips may be played at a much higher speed (e.g. 16× speed) by only playing each I-frame in the fast skim clip for the normal frame period.

The direction of the clip-to-clip order in the trick mode can be different than the direction of the order in which the frames of each clip are played. For example, if clips 1, 2, 3 in normal order each have frames A, B, C, in normal order then the clips can be played in reverse clip order of 3, 2, 1 while the frames within each clip is played in the normal order of A, B, C. Thus the clips are played in reverse clip order while the frames of the clips are played in normal order. This allows audio to be understood while the presentation is being played in a reverse trick mode.

The length of the trick play clips and the length of the fast skim clips may be the same length in relation to normal playing time or different lengths and the lengths of the clips may be predetermined or user adjustable during the trick mode play.

Figure 2:
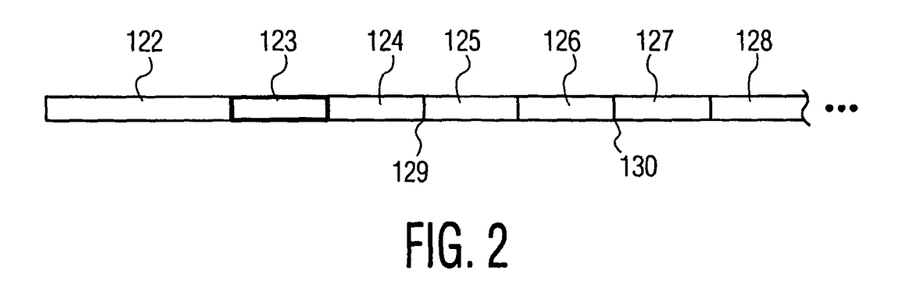
FIG. 2 illustrates an example signal of the invention.

FIG. 2 illustrates a specific example embodiment of the signal of the invention. A first portion 122 may be provided which contains indications of the positions of the trick play clips. The remaining portions of the signal may contain multiple trick play clips 123, 125 and 127 alternating with multiple fast skim clips 124, 126, and 128. The ellipse following fast skip clip 128 indicates that the alternating clips continue. For example, a one hour performance with ¼ second long clips may contain about 7,000 trick play clips.

The first clip 123 following the table of pointers is a trick play clip, but alternatively (not shown) the performance may begin with a fast skip clip. The indications of position of portion 122 may be a table containing pointers to the positions of the start of each trick play clip or a list of pointers. Pointers to the ends of the trick play clips (beginnings of the fast skim clips) may also be required if the trick play clips are not uniform in size. Instead of providing the pointers in a separate portion before or after the performance, pointers for subsequent trick play clips may be provided within previous trick play clips. Alternatively, indications such as a clip ID can be provided in the compressed performance at the beginning of a trick play clip or near the end of the previous fast skip clip, and the last portion of the fast skip clip can be scanned to find the beginning of the trick play clip.

For a video performance (i.e. a performance that includes video) each trick play clip will include data for a multitude of video frames. The number of frames contained in a trick play clip will be sufficient so that when the clip is played in the trick play video mode, the audience will be able to perceive some of the contents of the clip. That is, when played in the trick play mode, the trick play clips will be more just be an unintelligible blur, but would be recognizable by someone who was very familiar with the performance.

An advantage of providing pointers in the signal prior to the trick play clips is that when the signal is stored and the playing of the fast skim clips are going to be skipped entirely, then the reading and processing of the fast skim clips can also be skipped.

Figure 3:
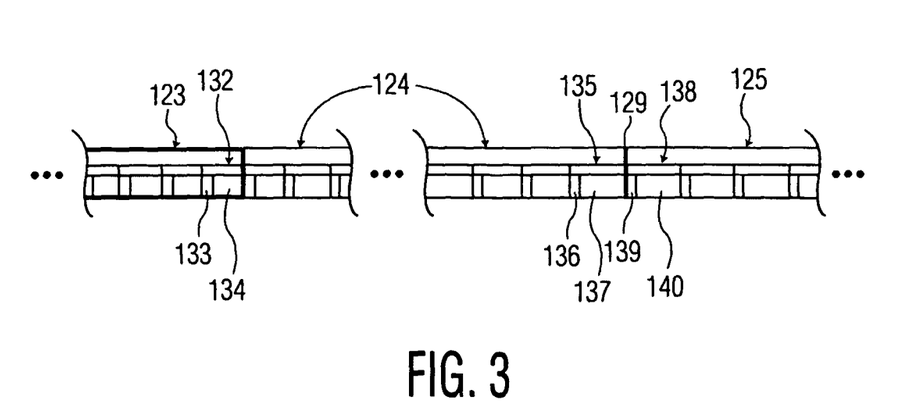
FIG. 3 shows additional details of the example signal of FIG. 2.

FIG. 3 is a more detailed illustration of portions of the example signal of FIG. 2. Each clip 123, 124 and 125 contains a multitude of respective packets such as packets 132, 135 and 138 respectively and each packet contains a respective header 133, 136 and 139 and each packet includes a respective data section 134, 137 and 140. In addition or in the alternative to the other indications, the locations of the trick play clips may be indicated in the last packet of the previous fast skim clip, for example, a flag or clip ID may be provided in header 136 to indicate that packet 138 is the first packet of a fast play clip. Also, in addition or in the alternative to other indications, the locations of the trick play clips may be indicated in the first packet of the trick play clips such as by a flag in header 139 of the first packet 138 of trick play clip 125. Also, in addition or in the alternative to other indications, the locations of the trick play clips may be indicated in the previous trick play clip, such as, by a pointer in a packet of trick play clip 123 to the start 129 of the following trick play clip 125.

In this example, the trick play clips are the same for every type of media that is played during the trick play mode. However, playing of each type of media can only begin at a trick mode entry point for that type of media. It is possible to arrange the packets of the performance so that, at the start of each trick play clip, the next packet for each type of media to be played is a trick mode entry point for that type of media. Alternately, after the start of the trick play clip, playing of each type of media will just be delayed until a trick mode entry point for that type of media is reached. Similarly, it is possible to arrange the packets so that the last packet of each type of media in the trick play clip is a trick mode exit point so that the trick mode can stop playing without causing artifacts. Alternatively, play of each media can end at the last trick mode exit point for that type of media in the trick play clip. Another alternative is for trick mode playing of each type of media (being played), to end when the first trick mode exit point is reached after the end of the trick mode clip.

Alternately, different trick play clips can be defined for each different type of media. In this case indications will be provided for the positions of the trick mode clips of each type of media. If the playing of the fast skim clips will be skipped in the trick mode, then it is possible to reduce the reading of fast skim clips by selecting the trick play clips for different media so that at least in some cases the different fast skim clips overlap for all the types of media.

Figure 4:
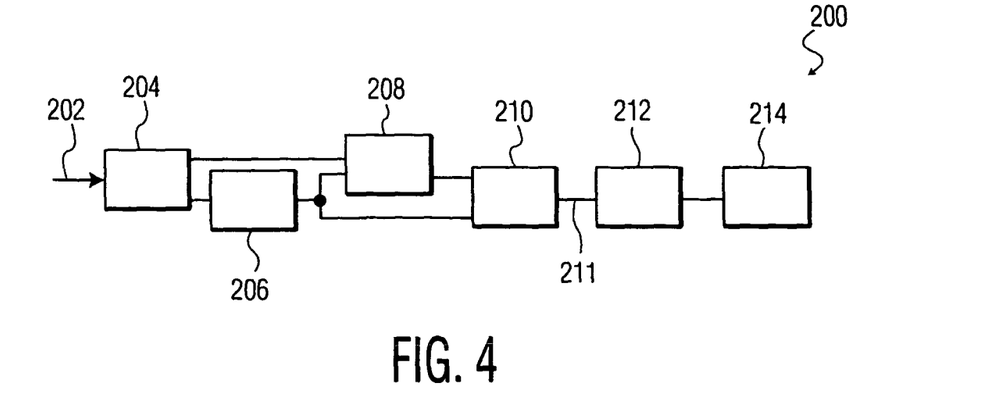
FIG. 4 illustrates a recorder of the invention.

FIG. 4 illustrates a recorder 200 of the invention for producing storage medium containing the performance including the trick play clips and indications of the locations of the trick play clips. A performance is provided at input 202. Selection unit 204 is used to select the trick play clips of the performance for use in trick play modes. Encoder 206 compress the performance. Indication determining unit 208 determines indications of the positions of the trick play clips to be stored with the performance. Formatting unit 210 formats the performance and the indications of the positions of the trick play clips together into a signal 211 of the invention which is transmitted through a transmission medium to write head 212 which records the signal onto storage medium 214.

Encoder 206 is not required if the performance does not have to be encoded. If storage medium 214 is a solid state medium then write head 212 is not required and the signal can be directly stored on the solid state medium. Storage medium 214 may for example be a removable record carrier such as a DVD disc or a master disc used in a press for subsequently producing multiple record carriers.

Figure 5:
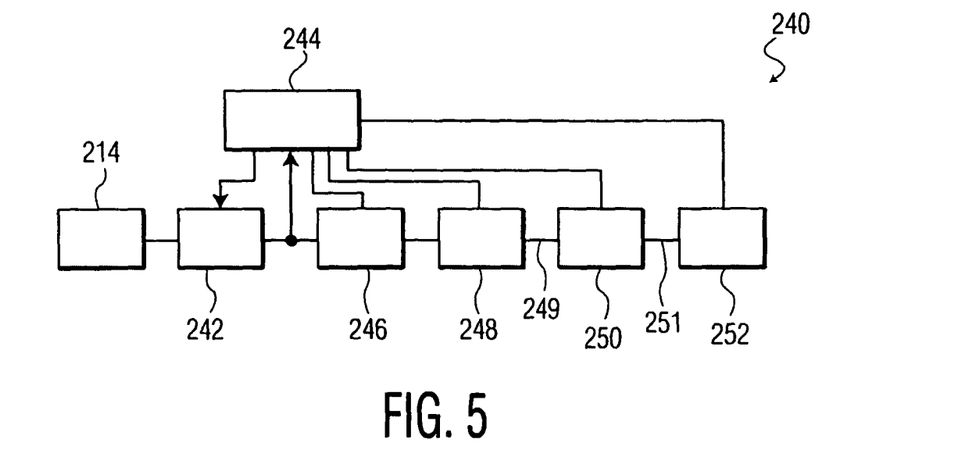
FIG. 5 illustrates a player of the invention.

FIG. 5 illustrates a player 240 of the invention for playing the performance including playing the trick play clips in the trick play mode. Storage medium 214 is read by read head 242 which is controlled by controller 244. If the trick play clips are predetermined and if the fast skim clips are skipped during the trick play mode, then controller 244 receives the indications of the positions of the trick play clips and during the trick play mode, the controller controls the read head to skip reading of the fast skim clips. Selector 246 selects portions of the read signal to be decoded depending on a signal from controller 244. If the trick play clips are not predetermined then during the trick play mode the selector is used to select the trick play clips and fast skip clips for playing in the trick play mode. Decoder 248 decompresses the selected portions of the read signal and provided the decompressed signal 249 to frame formatter 250 which formats the signal into presentation signal 251 which is transmitted to presentation unit 252 which plays the presentation to an audience in the normal and trick play mode. The formatting of the frame formatter 250 may be under the control of controller 244 to provide only the desired frames and control presentation unit 252 to provide the desired frame rate.

If the trick play clips are predetermined and if the fast skim clips are skipped during the trick play mode, then selector 426 may not be required.

The recorder of FIG. 4 can be combined with the recorder of FIG. 5 to produce a single apparatuses having both recording and playing capabilities.

Figure 6:
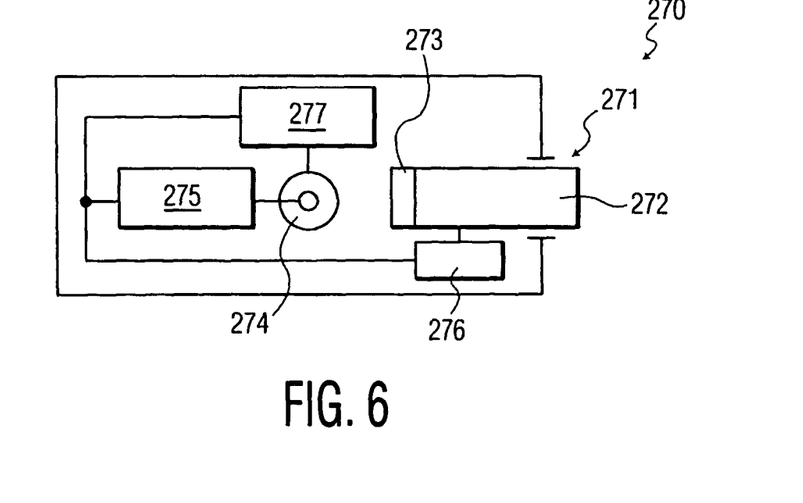
FIG. 6 illustrates a digital video cassette recorder of the invention.

FIG. 6 illustrates a digital video cassette recorder 270. The recorder has an opening 271 for receiving a video cassette 272 containing a video tape 273. A drive 274 rotates a rotating head 275 reads frames of a digital video performance from slanted tracks across the video tape. The video performance is encoded based on groups of pictures (GOPs) and the beginning of a GOP is at the start of each track. A tape drive mechanism 276 moves the video tape longitudinally at the rotating head. A controller 277 contains programmed modules for: controlling the speed of rotation of the head and the linear speed of the tape in synchronization to provide a normal speed of reading consecutive frames from one of the tracks and a different trick play mode speed for reading consecutive frames from one of the tracks at a different speed; and controlling the playing of portions of the performance in a trick play mode in which multiple frames in a first portion of the track beginning at the start of the track are played and multiple frames of a second portion of the track ending at the end of the track are skimmed, the second portion being as long or longer than the first portion, the skimming being skipping or playing at a faster rate than the first portion is played, and the speed at which frames are played is different than the speed at which frames are read from the tape.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:
1. A method comprising:
providing a performance for presentation during normal playing of the performance with a predetermined normal speed in a predetermined normal direction, the performance including a multitude of frames;
storing the performance on a storage medium;

reading portions of the performance from the storage medium;

selecting, and storing an indication thereof, frames of the multitude of frames as start locations of respective trick play clips, each trick play clip including multiple frames, for playing in a trick play mode having a trick play speed different from the normal speed, defining portions of the performance between the trick play clips as fast skim clips for skimming in the trick play mode, the skim clips alternating with the trick play clips in the normal direction of play; and playing, in response to the stored identification and in the trick play mode, the trick play clips and skimming the fast skim clips between the trick play clips, the skimming being either skipping of fast skim clips or playing fast skim clips at a substantially higher speed than the trick play clips in the trick play mode, the trick play clips being presented at a slower speed than the trick play speed and the fast skim clips being presented at a faster play speed than the trick play speed.

2. The method of claim 1 in which in the trick play mode, the trick play clips are played at the normal speed.

3. The method of claim 1 in which in the trick play mode, the trick play clips are played at a faster than normal speed which can be understood by the audience.

4. The method of claim 1 in which in the trick play mode, the fast skim clips are played at least twice as fast as the trick play clips.

5. The method of claim 1 in which: the performance includes video, the frames include video frames, and the trick play clips and fast skim clips include video clips; and in the trick play mode the trick play video clips are presented at less than about 8 times the normal speed so the video clips can be understood by the audience.

6. The method of claim 5 in which when one of the trick play video clips is played in the trick play mode, multiple video frames of the trick play video clip are skipped and multiple other video frames of the trick play video clip are played.

7. The method of claim 5 in which the trick play video clips are selected during an authoring process prior to storing the performance so that the trick play video clips contain logically related portions of video.

8. The method of claim 7 in which the trick play audio clips are selected during an authoring process prior to storing the performance so that the trick play clips contain meaningful portions of audio.

9. The method of claim 7 in which the performance includes video at a normal video speed, and in the trick play mode, a trick play video speed is different than the normal video speed and the trick play video speed is different than a trick play audio speed.

10. The method of claim 9 in which the trick play video speed is less than the normal video speed to provide slow motion trick play mode and the trick play audio speed is substantially normal during the slow motion trick play mode.

11. The method of claim 9 in which the video speed is faster than normal to provide fast motion trick play mode and the audio speed is substantially normal audio during the fast motion trick play mode.

12. The method of claim 9 in which the video direction is the reverse of the normal direction to provide a reverse motion trick play mode and the trick play audio clips are provided in reverse order but the contents of the audio clips are played in the normal direction so the audio clips can be understood during the reverse motion trick play mode.

13. The method of claim 1 in which: the performance includes audio, the frames include audio frames, and the trick play clips and fast skim clips each include audio clips; in the trick play mode the fast skim audio clips are skipped; for multiple trick play audio clips, none of the frames of the trick play audio clip are skipped in the trick play mode; in the trick play mode, the trick play audio clips are played less than about 3 times the normal speed so the audio clips can be understood by the audience.

14. The method of claim 1 in which: the performance is a multimedia performance and the frames includes frames of at least two types of media and the trick play clips and fast skim clips each include clips of at least two different types of media; and for each of the at least two types of media, the respective trick play clips for that media are sufficiently long and presented at a sufficiently low speed that they can be understood by the audience.

15. The method of claim 14 in which the trick play clips start at different positions for the different media.

16. The method of claim 14 in which the performance includes audio and video, the frames include audio frames and video frames, and the trick play clips and fast skim clips include audio clips and video clips.

17. The method of claim 16 in which in the trick play mode, the trick play audio clips are presented at less than about 3 times the normal audio speed and the trick play video clips are presented at less than about 8 times the normal video speed.

18. The method of claim 16 in which the trick play audio clips and trick play video clips are at the same positions in the performance and both are played at the same multiple of their respective normal speeds in the trick play mode.

19. The method of claim 18 in which the trick play audio clips and trick play video clips are both played at their respective normal speeds.

20. The method of claim 16 in which the trick play audio clips are played at the normal audio speed and the trick play video clips are played at a faster than normal video speed.

21. The method of claim 16 in which the trick play audio clips and trick play video clips are both played at a different multiple of their respective normal speeds.

22. The method of claim 21 in which the audio portions are presented at a lower speed above normal speed than the video portions.

23. The method of claim 1 in which there are trick mode entry points at intervals of multiple frames in the stored performance, and the trick play clips are selected to begin at respective trick mode entry points, but not at every trick mode entry point.

24. The method of claim 23 in which the performance includes video and the stored video is encoded into groups of pictures, and a trick mode entry point is at the beginning of each group of pictures and a trick mode exit point is at the end of every picture.

25. The method of claim 23 in which the positions of trick play clips are determined prior to storing the performance and pointers to the trick play clips are stored an the same storage medium as the performance.

26. The method of claim 25 in which pointers to the trick play clips are stored in a table that is separate from the performance.

27. The method of claim 1 in which the length of the fast skim clips are more than 2 times the length of the trick play clips, the length being measured in numbers frames.

28. The method of claim 1 in which the length of the trick play clips are user adjustable after storing the performance.

29. The method of claim 1 in which the length of the fast skim clips are user adjustable after storing the performance.

30. The method of claim 1 in which the speed for playing the trick play clips is user adjustable after storing the performance.

31. A player comprising:
means for reading portions of a stored performance from a storage medium, the performance including a multitude of sequential frames for presentation during normal playing of the performance in a predetermined normal direction at a predetermined normal speed, the performance being divided into trick play clips for playing in a trick play mode, each trick play clip including multiple frames, and other fast skim clips for skimming in the trick play mode; and
means for playing portions of the performance in the trick play mode, the trick play mode including playing trick play clips and skimming fast skim clips between the trick play clips, multiple trick play clips and fast skim clips each containing multiple subsequent frames of the performance, the trick play clips alternating with the fast skim clips in the normal frame presentation order; the skimming being either skipping of fast skim clips or playing fast skim clips at a substantially higher speed than the trick play clips in the trick play mode, the average speed of the playing and skimming in the trick play mode being substantially different than the normal speed, the trick play clips being sufficiently long and being presented at a sufficiently low speed so that the content of the trick play clips can be understood by a human audience.

32. The player of claim 31, further comprising means for selecting the trick play clips and fast skim clips during the playing in the trick play mode.

33. The player of claim 31, in which the stored performance is compressed and the player further comprises means for decompressing the portions of the performance read from the storage medium.

34. The player of claim 33, in which portions of the fast skim clips are not decompressed during the playing in the trick play mode.

35. The player of claim 31, further comprising means for reading pointers to the trick play clips from the storage medium, the playing of the trick play clips during the trick play mode depending on the pointers.

36. The player of claim 35 in which the reading of portions of the stored performance also depending on the stored pointers.

37. The player of claim 35 in which the performance is compressed and the player further comprises means for decompressing portions of the performance, and the decompressing depends on the stored pointers to the trick play clips.

38. The player of claim 31 further comprising a play unit for presenting the decompressed portions of the performance to an audience.

39. A recorder comprising:
an input for receiving a performance, the performance including a multitude of sequential frames for presentation during normal playing of the performance in a predetermined normal direction at a predetermined normal speed;
means for selecting trick play clips of the stored performance for playing in a trick play mode, portions of the performance between the trick play clips being defined as fast skim clips for skimming in the trick play mode, multiple trick play clips and fast skim clips, each clip containing multiple sequential frames, the trick play clips alternating with the fast skim clips in the normal frame presentation order, the trick play mode including playing the trick play clips and skimming the fast skim clips between the trick play clips, the skimming including either skipping of fast skim clips or playing fast skim clips at a substantially higher speed than the trick play clips in the trick play mode, the average speed of the playing and skimming in the trick play mode being substantially different than the normal speed, the trick play clips being sufficiently long and being presented at a sufficiently low speed so that the content of the trick play clips can be understood by a human audience;
means for storing the performance on a storage medium and storing indications of the positions of the trick play clips on the storage medium, the indications of the positions of the trick play clips defining which portions of the performance are trick play clips and which portions of the performance are fast skim clips.

40. The recorder of claim 39 in which the storage medium is a tape and recorder is a tape recorder and the indications of the positions of the trick play clips are pointers that are stored on the tape at a position that is different than the position that the performance is stored on the tape.

41. A method comprising:
providing a performance including a multitude of sequential frames for presentation during normal playing of the performance in a predetermined normal direction at a predetermined normal speed;
selecting trick play clips of the stored performance for playing in a trick play mode, each trick play clip including multiple frames, portions of the performance between the trick play clips being defined as fast skim clips for skimming in the trick play mode, multiple trick play clips and fast skim clips each containing multiple sequential frames, the trick play clips alternating with the fast skim clips in the normal frame presentation order, the trick play clips being sufficiently long so that the content of the trick play clips can be understood by a human audience when playing the trick play clips and skimming the fast skim clips between the trick play clips, the skimming being either skipping of fast skim clips or playing fast skim clips at a substantially higher speed than the trick play clips in the trick play mode, the average speed of the playing and skimming in the trick play mode being substantially faster than the normal speed;
storing the performance on a storage medium along with indications of the positions of the trick play clips which define which portions of the performance are trick play clips and which portions of the performance are fast skim clips.

42. A computer readable, non-transitory transmission medium storing data that when executed by a processor perform the steps of:
displaying a performance including a multitude of sequential frames for presentation during normal playing of the performance in a predetermined normal frame presentation order at a predetermined normal speed,
displaying the performance including trick play clips for playing in a trick play mode each trick play clip including multiple frames, portions of the performance between the trick play clips being defined as fast skim clips for skimming in the trick play mode, multiple trick play clips and fast skim clips each containing multiple sequential frames, the trick play clips alternating with the fast skim clips in the normal frame presentation order, the trick play clips being sufficiently long so that the content of the trick play clips can be understood by a human audience when playing the trick play clips and skimming the fast skim clips between the trick play clips, when the skimming includes either skipping of fast skim clips or playing fast skim clips at a substantially higher speed than the trick play clips in the trick play mode, the average speed of the playing and skimming in the trick play mode being substantially faster than the normal speed; and displaying a performance in response to indications of the positions of the trick play clips which define which portions of the performance are trick play clips and which portions of the performance are fast skim clips.

43. A video player comprising:

an input for accessing a performance having a plurality of sequential image frames and stored on a non-transitory storage medium; and a controller configured and arranged to     play the performance in a normal play mode that is at a normal speed; and     play the performance in a trick play mode that is at a trick play speed that is faster than the normal speed and that is achieved by         playing a plurality of trick play clips, each clip containing a plurality of image frames, at a speed slower than the trick play speed; and         playing, between each of the trick play clips, a fast skim clip at a speed faster than the trick play speed.

44. The video player of claim 43, wherein the controller is further configured and arranged to locate the trick play clips by accessing trick play clip positional indications stored on the non-transitory storage medium.

45. The video player of claim 43, wherein the controller is further configured and arranged to locate the trick play clips by accessing a table of pointers providing trick play clip positional indications.

46. The video player of claim 43, wherein the performance includes media other than video and wherein the controller is further configured and arranged to, after the start of a trick play mode, delay playing of the media other than video until a trick play entry point is reached for the media other than video.

47. The video player of claim 43, wherein the controller is further configured and arranged to locate the trick play clips by accessing trick play clip positional indications stored on the non-transitory storage medium and indicating a start and a stop of the trick play clips.

* * * * *